US010790751B2

(12) United States Patent
Zhang et al.

(10) Patent No.: US 10,790,751 B2
(45) Date of Patent: *Sep. 29, 2020

(54) SYSTEMS AND METHODS FOR REAL-TIME SIGNAL SAMPLING IN POWER CONVERSION SYSTEMS

(71) Applicant: ON-BRIGHT ELECTRONICS (SHANGHAI) CO., LTD., Shanghai (CN)

(72) Inventors: Yunchao Zhang, Shanghai (CN); Lieyi Fang, Shanghai (CN)

(73) Assignee: On-Bright Electronics (Shanghai) Co., Ltd., Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/432,752

(22) Filed: Jun. 5, 2019

(65) Prior Publication Data

US 2020/0014302 A1  Jan. 9, 2020

Related U.S. Application Data

(63) Continuation of application No. 15/621,865, filed on Jun. 13, 2017, now Pat. No. 10,355,598, which is a
(Continued)

(30) Foreign Application Priority Data

Feb. 25, 2013 (CN) .......................... 2013 1 0058987

(51) Int. Cl.
*H02M 3/335* (2006.01)
(52) U.S. Cl.
CPC .............................. *H02M 3/33507* (2013.01)
(58) Field of Classification Search
CPC .... H02M 3/156; H02M 3/157; H02M 3/1588; H02M 3/33507; H02M 2001/0012; Y02B 70/1466
(Continued)

(56) References Cited

U.S. PATENT DOCUMENTS 4,947,171 A   8/1990   Pfeifer et al.
5,877,802 A   3/1999   Takahashi et al.
(Continued)

FOREIGN PATENT DOCUMENTS

CN   101707385 A   5/2010
CN   101710785 A   5/2010
(Continued)

OTHER PUBLICATIONS

Chinese Patent Office, Office Action dated Sep. 28, 2014, in Application No. 201310058987.8.
(Continued)

*Primary Examiner* — Shawki S Ismail
*Assistant Examiner* — Monica Mata
(74) *Attorney, Agent, or Firm* — Faegre Drinker Biddle & Reath LLP

(57) ABSTRACT

System and method for regulating a power conversion system. An example system controller includes a signal processing component and a driving component. The signal processing component is configured to receive a feedback signal associated with an output signal of a power conversion system and generate a processed signal based on at least information associated with the feedback signal. The driving component is configured to generate a drive signal based on at least information associated with the processed signal and output the drive signal to a switch in order to affect a primary current flowing through a primary winding, the drive signal being associated with a demagnetization period corresponding to a demagnetization process of the power conversion system. The signal processing component is further configured to, sample and hold the feedback signal a plurality of times during the demagnetization period to generate a plurality of sampled and held signals.

30 Claims, 11 Drawing Sheets

Related U.S. Application Data continuation of application No. 13/784,489, filed on Mar. 4, 2013, now Pat. No. 9,722,495.

(58) Field of Classification Search
USPC .......................................................... 323/283
See application file for complete search history.

(56) References Cited

U.S. PATENT DOCUMENTS

| | | | |
|---|---|---|---|
| 6,968,093 | B1 | 11/2005 | Boisvert et al. |
| 9,722,495 | B2 | 8/2017 | Zhang et al. |
| 10,355,598 | B2 | 7/2019 | Zhang et al. |
| 2008/0089100 | A1 | 4/2008 | Park et al. |
| 2008/0180973 | A1 | 7/2008 | Park et al. |
| 2010/0194359 | A1 | 8/2010 | Notman |
| 2011/0044076 | A1 | 2/2011 | Zhang et al. |
| 2011/0062934 | A1 | 3/2011 | Wolf et al. |
| 2011/0157922 | A1 | 6/2011 | Konecny et al. |
| 2012/0075891 | A1 | 3/2012 | Zhang et al. |
| 2012/0195076 | A1 | 8/2012 | Zhang et al. |
| 2013/0077354 | A1 | 3/2013 | Behagel et al. |
| 2014/0241014 | A1 | 8/2014 | Zhang et al. |
| 2017/0346403 | A1 | 11/2017 | Zhang et al. |

FOREIGN PATENT DOCUMENTS

| | | |
|---|---|---|
| CN | 101867299 A | 10/2010 |
| CN | 101867299 B | 3/2012 |
| CN | 102790531 A | 11/2012 |
| EP | 0335988 A1 | 3/1988 |

OTHER PUBLICATIONS

Chinese Patent Office, Office Action dated Oct. 27, 2015, in Application No. 201310058987.8.

Chinese Patent Office, Office Action dated Apr. 17, 2015, in Application No. 201310058987.8.

Chinese Patent Office, Office Action dated May 5, 2016, in Application No. 201310058987.8.

Taiwan Patent Office, Office Action dated Oct. 6, 2014, in Application No. 102113647.

SYSTEMS AND METHODS FOR REAL-TIME SIGNAL SAMPLING IN POWER CONVERSION SYSTEMS

1. CROSS-REFERENCES TO RELATED APPLICATIONS

This application is a continuation of U.S. patent application Ser. No. 15/621,865, filed Jun. 13, 2017, which is a continuation of U.S. patent application Ser. No. 13/784,489, filed Mar. 4, 2013, which claims priority to Chinese Patent Application No. 201310058987.8, filed Feb. 25, 2013, all of these applications being commonly assigned and incorporated by reference herein for all purposes.

2. BACKGROUND OF THE INVENTION

The present invention is directed to integrated circuits. More particularly, the invention provides a control system and method for signal sampling. Merely by way of example, the invention has been applied to real-time signal sampling in power conversion systems. But it would be recognized that the invention has a much broader range of applicability.

Generally, a conventional power conversion system often uses a transformer to isolate the input voltage on the primary side and the output voltage on the secondary side. To regulate the output voltage, certain components, such as TL431 and an opto-coupler, can be used to transmit a feedback signal from the secondary side to a controller chip on the primary side. Alternatively, the output voltage on the secondary side can be imaged to the primary side, so the output voltage is controlled by directly adjusting some parameters on the primary side. Then, some components, such as TL431 and an opto-coupler, can be omitted to reduce the system costs.

FIG. 1 is a simplified diagram showing a conventional flyback power conversion system with primary-side sensing and regulation. The power conversion system 100 includes a primary winding 110, a secondary winding 112, an auxiliary winding 114, a power switch 120, a current sensing resistor 130, an equivalent resistor 140 for an output cable, resistors 150 and 152, and a rectifying diode 160. For example, the power switch 120 is a bipolar junction transistor. In another example, the power switch 120 is a MOS transistor.

To regulate the output voltage within a predetermined range, information related to the output voltage and the output loading often needs to be extracted. For example, when the power conversion system 100 operates in a discontinuous conduction mode (DCM), such information can be extracted through the auxiliary winding 114. When the power switch 120 is turned on, the energy is stored in the secondary winding 112. Then, when the power switch 120 is turned off, the stored energy is released to the output terminal, and the voltage of the auxiliary winding 114 maps the output voltage on the secondary side as shown below.

$$V_{FB} = \frac{R_2}{R_1+R_2} \times V_{aux} = k \times n \times (V_o + V_F + I_o \times R_{eq}) \quad \text{(Equation 1)}$$

where $V_{FB}$ represents a voltage at a node 154, and $V_{aux}$ represents the voltage of the auxiliary winding 114. $R_1$ and $R_2$ represent the resistance values of the resistors 150 and 152 respectively. Additionally, n represents a turns ratio between the auxiliary winding 114 and the secondary winding 112. Specifically, n is equal to the number of turns of the auxiliary winding 114 divided by the number of turns of the secondary winding 112. $V_o$ and $T_o$ represent the output voltage and the output current respectively. Moreover, $V_F$ represents the forward voltage of the rectifying diode 160, and $R_{eq}$ represents the resistance value of the equivalent resistor 140. Also, k represents a feedback coefficient as shown below:

$$k = \frac{R_2}{R_1+R_2} \quad \text{(Equation 2)}$$

FIG. 2 is a simplified diagram showing a conventional operation mechanism for the flyback power conversion system 100. As shown in FIG. 2, the controller chip of the conversion system 100 uses a sample-and-hold mechanism. When the demagnetization process on the secondary side is almost completed and the current $I_{sec}$ of the secondary winding 112 almost becomes zero, the voltage $V_{aux}$ of the auxiliary winding 114 is sampled at, for example, point A of FIG. 2. The sampled voltage value is usually held until the next voltage sampling is performed. Through a negative feedback loop, the sampled voltage value can become equal to a reference voltage $V_{ref}$. Therefore, $$V_{FB}=V_{ref} \quad \text{(Equation 3)}$$

Combining Equations 1 and 3, the following can be obtained:

$$V_o = \frac{V_{ref}}{k \times n} - V_F - I_o \times R_{eq} \quad \text{(Equation 4)}$$

Based on Equation 4, the output voltage decreases with the increasing output current.

FIG. 3 is a simplified diagram showing another conventional power conversion system with primary-side sensing and regulation. The power conversion system 200 includes a controller chip 202, a primary winding 210, a secondary winding 212, an auxiliary winding 214, a power switch 220, a current sensing resistor 230, an equivalent resistor 240 for an output cable, resistors 250 and 252, and a rectifying diode 260. The controller chip 202 includes a signal processing component 204, a demagnetization detector 206, an error amplifier 208, a reference-signal generator 248, an oscillator 228, a modulation component 218, a logic controller 224, an over-current-protection (OCP) component 226, and a driving component 222. The signal processing component 204 includes a sampling component 242, a switch 244, and a capacitor 246. The controller chip 202 includes terminals 282, 284, and 286. For example, the power switch 220 is a bipolar junction transistor. In another example, the power switch 220 is a MOS transistor.

The signal processing component 204 samples and holds a feedback signal 254 in response to a demagnetization-detection signal 256 from the demagnetization detector 206. The error amplifier 208 receives a sampled-and-held signal 258 from the signal processing component 204 and a reference signal 272 from the reference-signal generator 248, and outputs an amplified signal 262 to the modulation component 218. The modulation component 218 also receives a clock signal 264 from the oscillator 228 and a current-sensing signal 268 and outputs a modulation signal 266 to the logic controller 224. The driving component 222 outputs a drive signal 270 to the power switch 220 in order to regulate a primary current 272 flowing through the primary winding 210.

But errors can occur when the signal processing component 204 samples the feedback signal 254. Hence it is highly desirable to improve the techniques of primary-side sensing and regulation.

3. BRIEF SUMMARY OF THE INVENTION

The present invention is directed to integrated circuits. More particularly, the invention provides a control system and method for real-time signal sampling. Merely by way of example, the invention has been applied to power conversion systems. But it would be recognized that the invention has a much broader range of applicability.

According to one embodiment, a system controller for regulating a power conversion system includes a signal processing component and a driving component. The signal processing component is configured to receive a feedback signal associated with an output signal of a power conversion system and generate a first processed signal based on at least information associated with the feedback signal. The driving component is configured to generate a drive signal based on at least information associated with the first processed signal and output the drive signal to a switch in order to affect a primary current flowing through a primary winding, the drive signal being associated with a demagnetization period corresponding to a demagnetization process of the power conversion system. The signal processing component is further configured to, sample and hold the feedback signal a plurality of times during the demagnetization period to generate a plurality of sampled and held signals, select a signal from the plurality of sampled and held signals, hold the selected signal, and generate the first processed signal based on at least information associated the selected and held signal.

According to another embodiment, a signal processing device for regulating a power conversion system includes a sampling and holding component and a selection and holding component. The sampling and holding component is configured to sample and hold a feedback signal a plurality of times during a demagnetization period and generate a plurality of sampled and held signals based on at least information associated with the feedback signal, the feedback signal being associated with an output signal of a power conversion system, the demagnetization period corresponding to a demagnetization process of the power conversion system. The selection and holding component is configured to select a signal from the plurality of sampled and held signals, hold the selected signal, and output a first processed signal based on at least information associated with the selected and held signal for regulating the power conversion system.

In one embodiment, a method for regulating a power conversion system includes receiving a feedback signal associated with an output signal of a power conversion system, generating a processed signal based on at least information associated with the feedback signal, and generating a drive signal based on at least information associated with the processed signal. The method further includes outputting the drive signal to a switch in order to affect a primary current flowing through a primary winding, the drive signal being associated with a demagnetization period corresponding to a demagnetization process of the power conversion system. The process for generating a processed signal based on at least information associated with the feedback signal includes, sampling and holding the feedback signal a plurality of times during the demagnetization period to generate a plurality of sampled and held signals, selecting a signal from the plurality of sampled and held signals, holding the selected signal, and generating the processed signal based on at least information associated the selected and held signal.

In another embodiment, a method for regulating a power conversion system includes sampling and holding a feedback signal a plurality of times during a demagnetization period, the feedback signal being associated with an output signal of a power conversion system, the demagnetization period corresponding to a demagnetization process of the power conversion system, generating a plurality of sampled and held signals based on at least information associated with the feedback signal, and selecting a signal from the plurality of sampled and held signals. The method further includes holding the selected signal, and outputting a processed signal based on at least information associated with the selected and held signal for regulating the power conversion system.

Depending upon embodiment, one or more benefits may be achieved. These benefits and various additional objects, features and advantages of the present invention can be fully appreciated with reference to the detailed description and accompanying drawings that follow.

4. BRIEF DESCRIPTION OF THE DRAWINGS

5. DETAILED DESCRIPTION OF THE INVENTION

The present invention is directed to integrated circuits. More particularly, the invention provides a control system and method for real-time signal sampling. Merely by way of example, the invention has been applied to power conversion systems. But it would be recognized that the invention has a much broader range of applicability.

Figure 1:
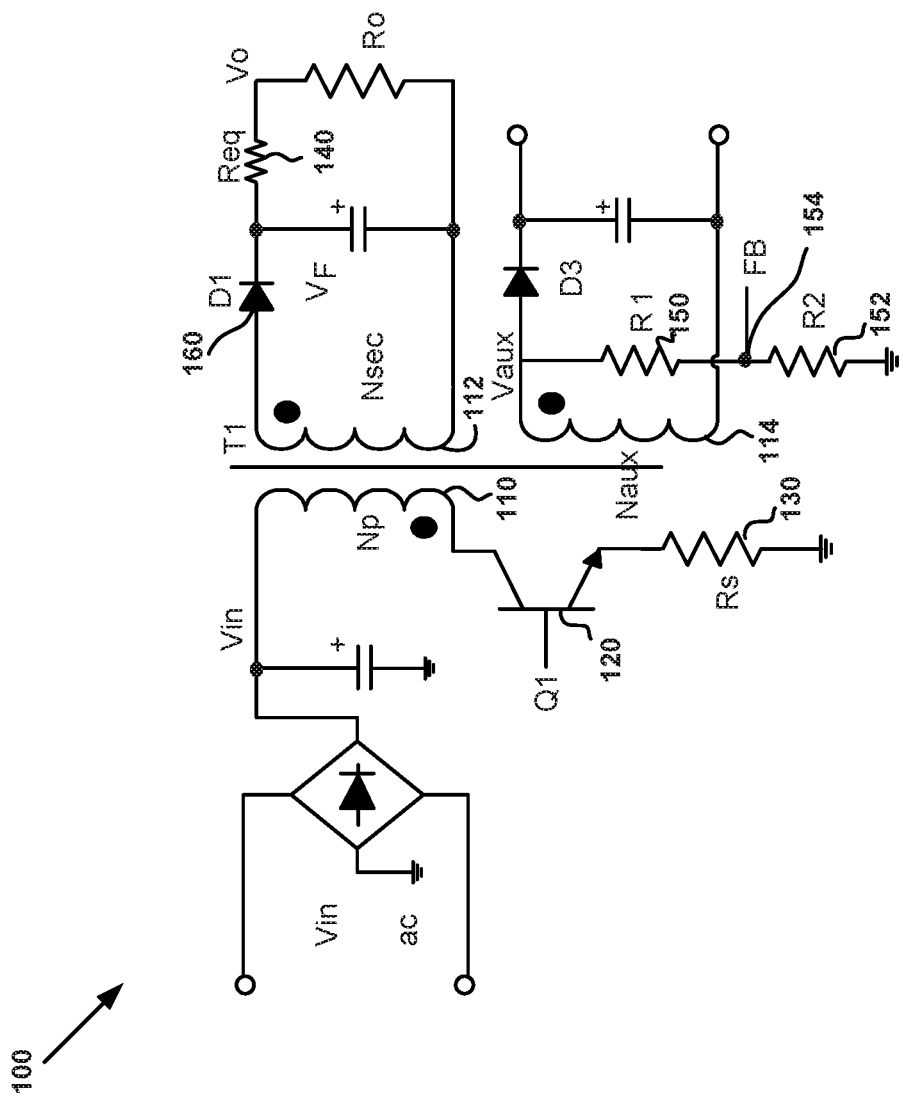
FIG. 1 is a simplified diagram showing a conventional flyback power conversion system with primary-side sensing and regulation.
Figure 2:
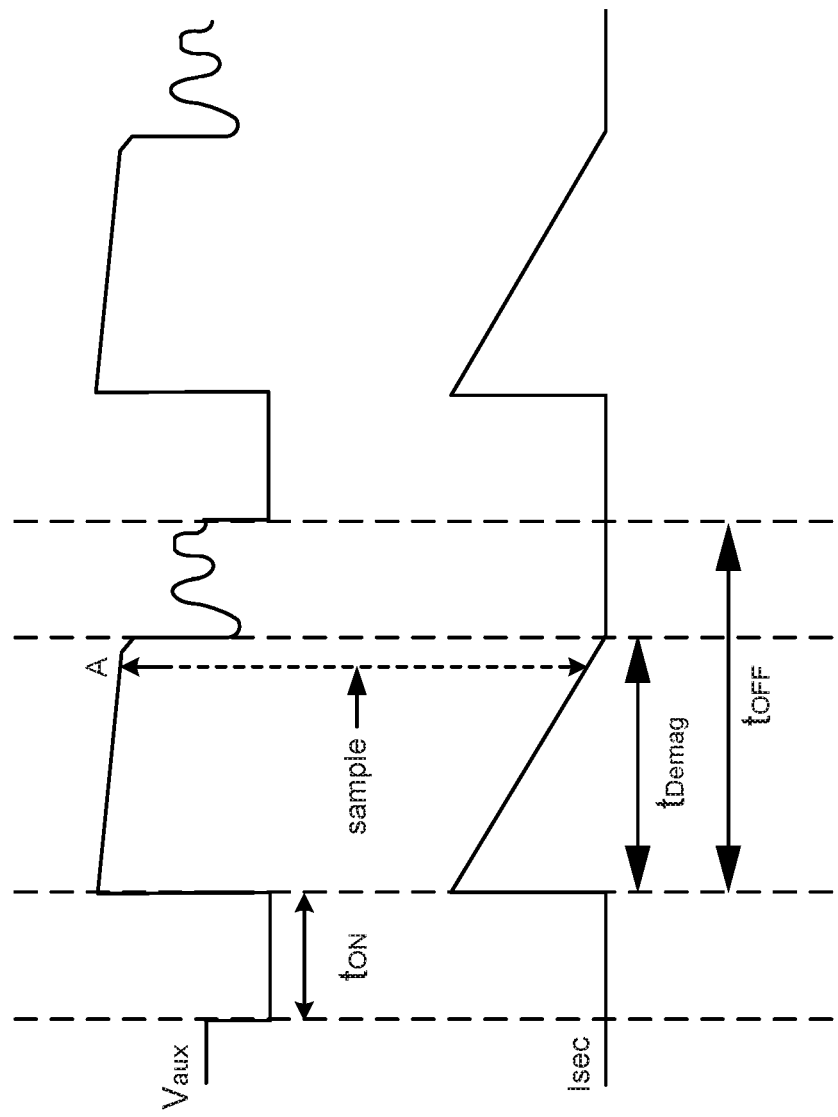
FIG. 2 is a simplified diagram showing a conventional operation mechanism for the flyback power conversion system as shown in FIG. 1.
Figure 3:
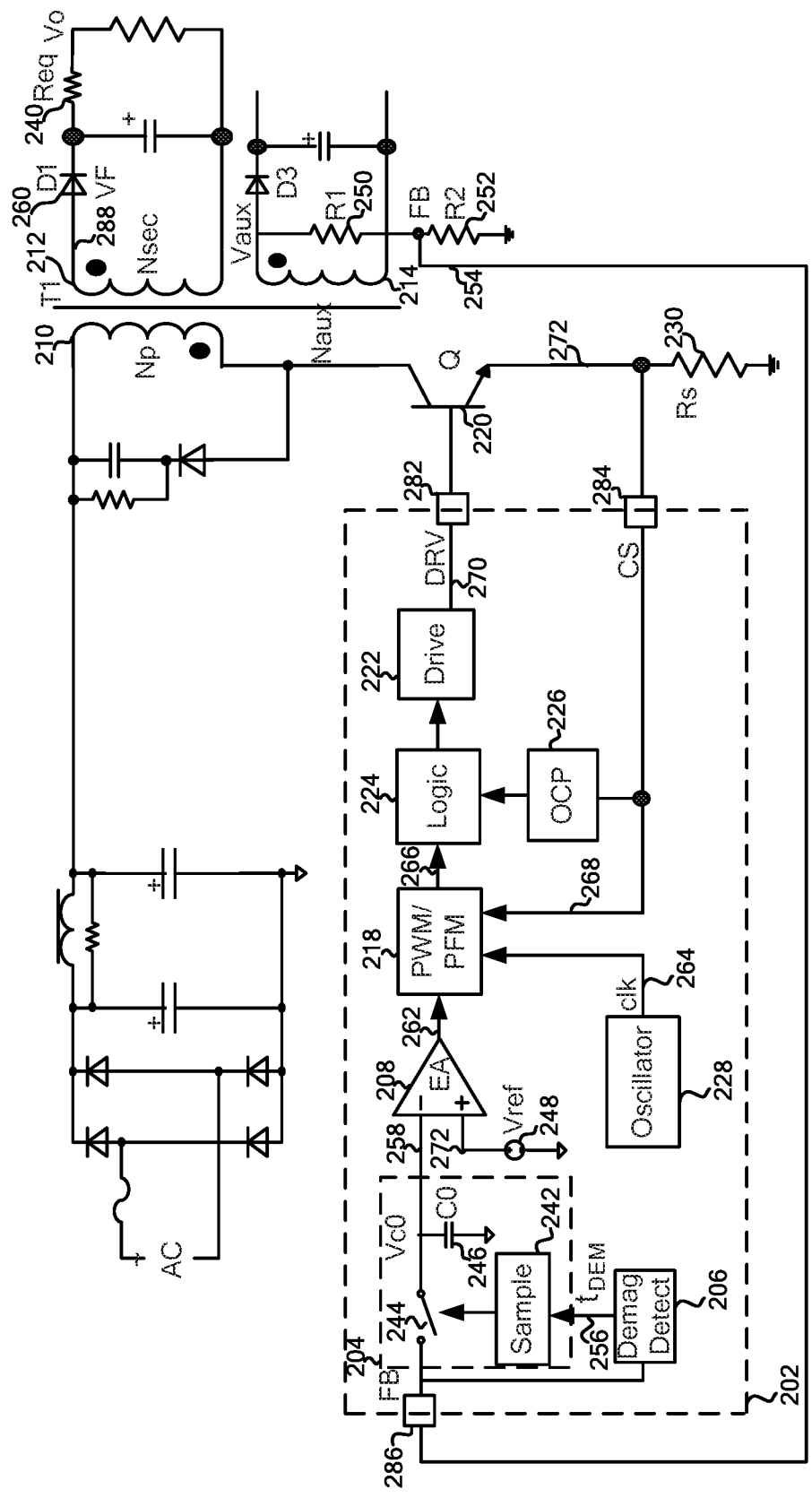
FIG. 3 is a simplified diagram showing another conventional power conversion system with primary-side sensing and regulation.
Figure 4:
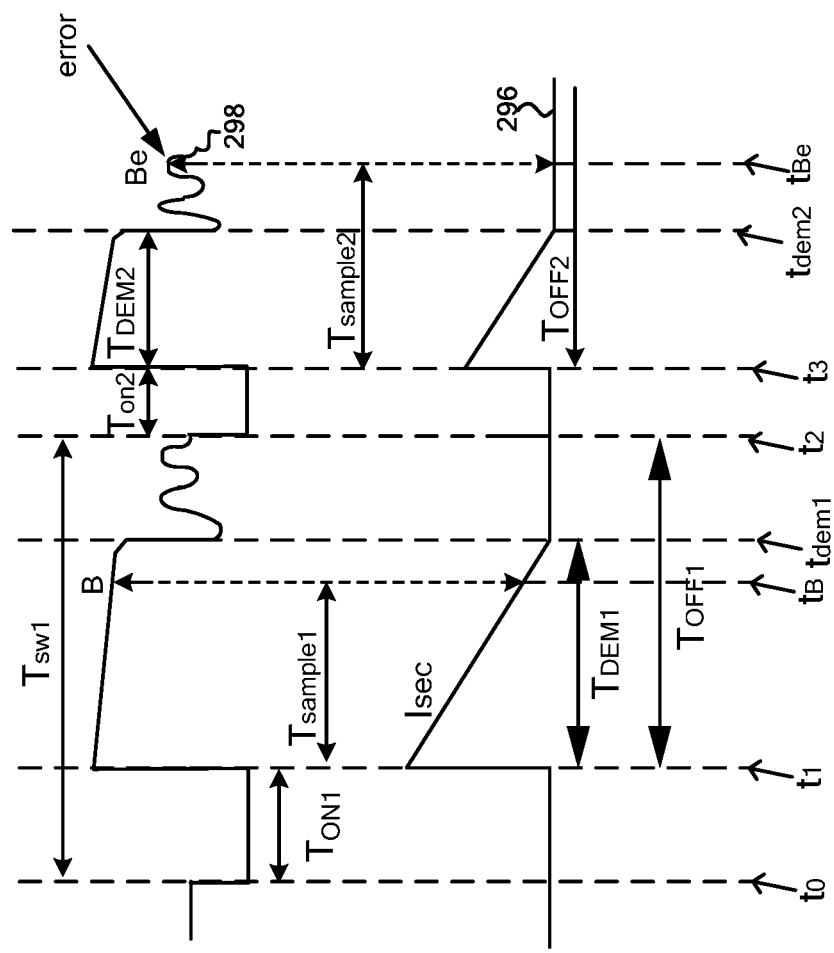
FIG. 4 is a simplified diagram showing certain specific error for the power conversion system as shown in FIG. 3 according to one embodiment.

FIG. 4 is a simplified diagram showing certain specific error for the power conversion system 200 according to one embodiment. The waveform 296 represents a secondary current 288 flowing through the secondary winding 212 as a function of time, and the waveform 298 represents the feedback signal 254 as a function of time. As shown in FIG. 4, a first switching period $T_{sw1}$ includes a first on-time period $T_{on1}$ and a first off-time period $T_{off1}$. The first on-time period starts at time $t_0$ and ends at time $t_1$, and the first off-time period $T_{off1}$ starts at the time $t_1$ and ends at time $t_2$. The first off-time period $T_{off1}$ includes a first demagnetization period $T_{DEM1}$ which starts at the time $t_1$ and ends at time $t_{dem1}$. A second on-time period $T_{on2}$ of a subsequent switching period starts at the time $t_2$ and ends at time $t_3$, and a second off-time period $T_{off2}$ of the subsequent switching period starts at the time $t_3$. The second off-time period $T_{off2}$ includes a second demagnetization period $T_{DEM2}$ which starts at the time $t_3$ and ends at time $t_{dem2}$.

During the switching period $T_{sw1}$, the signal processing component 204 samples the feedback signal 254 at point B which may be determined according to the duration of a demagnetization period in a preceding switching period. As shown in FIG. 4, the point B corresponds to time $t_B$, and the duration of a time period $T_{sample1}$ between the time $t_1$ and the time $t_B$ is equal to ⅔ of the duration of the demagnetization period of the preceding switching period. Then, during the subsequent switching period, the signal processing component 204 samples the feedback signal 254 at point $B_e$ corresponding to time $t_{Be}$. The duration of a time period $T_{sample2}$ between $t_3$ and $t_{Be}$ is determined to be equal to ⅔ of the duration of the demagnetization period $T_{DEM1}$. But because the demagnetization period $T_{DEM2}$ is much shorter in duration than the demagnetization period $T_{DEM1}$, the sampling point $B_e$ corresponding to the time $t_{Be}$ is out of the demagnetization period $T_{DEM2}$. Thus, errors occur when the signal processing component 204 samples the feedback signal 254 at point $B_e$, which may cause instability of the loop.

Figure 5:
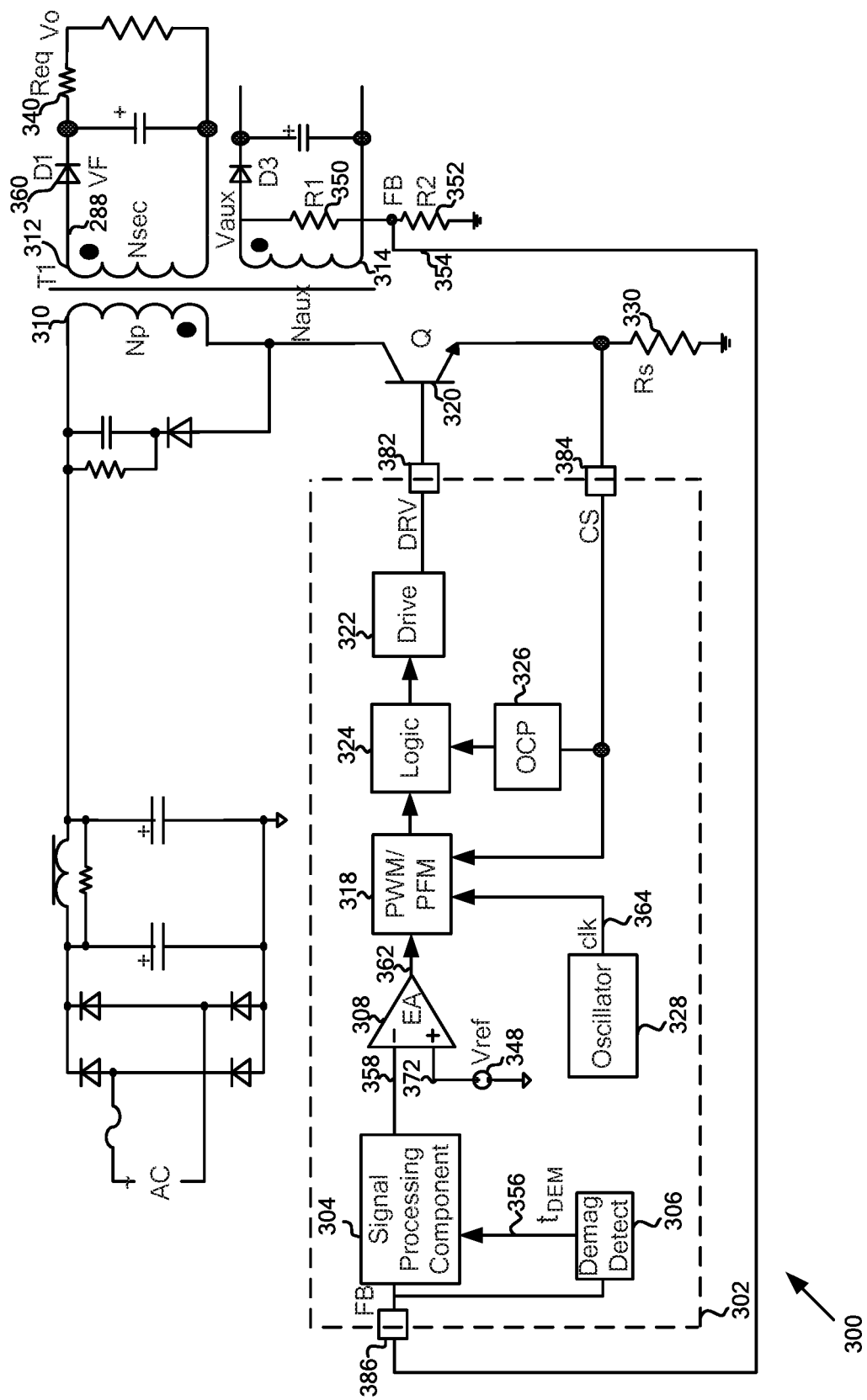
FIG. 5 is a simplified diagram showing a power conversion system with real-time signal sampling according to an embodiment of the present invention.

FIG. 5 is a simplified diagram showing a power conversion system with real-time signal sampling according to an embodiment of the present invention. This diagram is merely an example, which should not unduly limit the scope of the claims. One of ordinary skill in the art would recognize many variations, alternatives, and modifications. The power conversion system 300 includes a controller chip 302, a primary winding 310, a secondary winding 312, an auxiliary winding 314, a power switch 320, a current sensing resistor 330, an equivalent resistor 340 for an output cable, resistors 350 and 352, and a rectifying diode 360. The controller chip 302 includes a signal processing component 304, a demagnetization detector 306, an error amplifier 308, a reference-signal generator 348, an oscillator 328, a modulation component 318, a logic controller 324, an over-current-protection (OCP) component 326, and a driving component 322. The controller chip 302 includes terminals 382, 384, and 386. For example, the power switch 320 is a bipolar junction transistor. In another example, the power switch 320 is a MOS transistor.

According to one embodiment, the signal processing component 304 samples and holds a feedback signal 354 in response to a demagnetization-detection signal 356 from the demagnetization detector 306. For example, the error amplifier 308 receives a processed signal 358 from the signal processing component 304 and a reference signal 372 from the reference-signal generator 348, and outputs an amplified signal 362 to the modulation component 318. In another example, the modulation component 318 also receives a clock signal 364 from the oscillator 328 and a current-sensing signal 368 and outputs a modulation signal 366 to the logic controller 324. In yet another example, the driving component 322 outputs a drive signal 370 to the power switch 320 in order to regulate a primary current 372 flowing through the primary winding 310.

According to some embodiments, the signal processing component 304 performs real-time signal sampling. For example, the signal processing component 304 samples the feedback signal 354 based on information associated with a current switching period, instead of information of a preceding switching period. Thus, even if the duration of demagnetization periods varies in different switching periods, errors will not be introduced into sampling, in certain embodiments.

Figure 6:
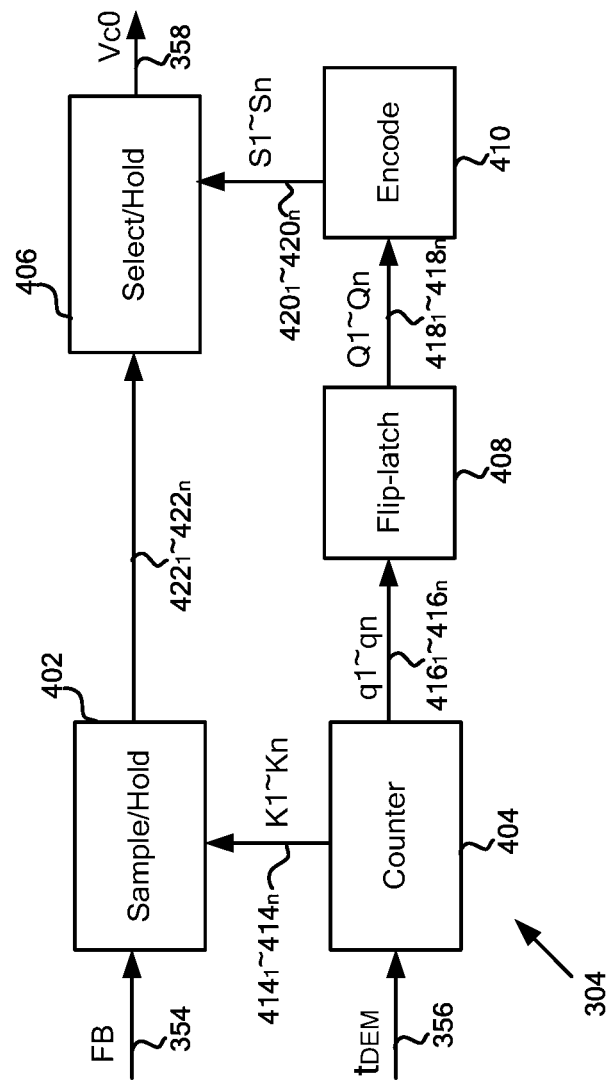
FIG. 6 is a simplified diagram showing the signal processing component as part of the power conversion system as shown in FIG. 5 according to an embodiment of the present invention.

FIG. 6 is a simplified diagram showing the signal processing component 304 as part of the power conversion system 300 according to an embodiment of the present invention. This diagram is merely an example, which should not unduly limit the scope of the claims. One of ordinary skill in the art would recognize many variations, alternatives, and modifications. The signal processing component 304 includes a sample-and-hold component 402, a select-and-hold component 406, a counter component 404, a flip-latch component 408, an encoding component 410, and a capacitor 412.

Figure 7:
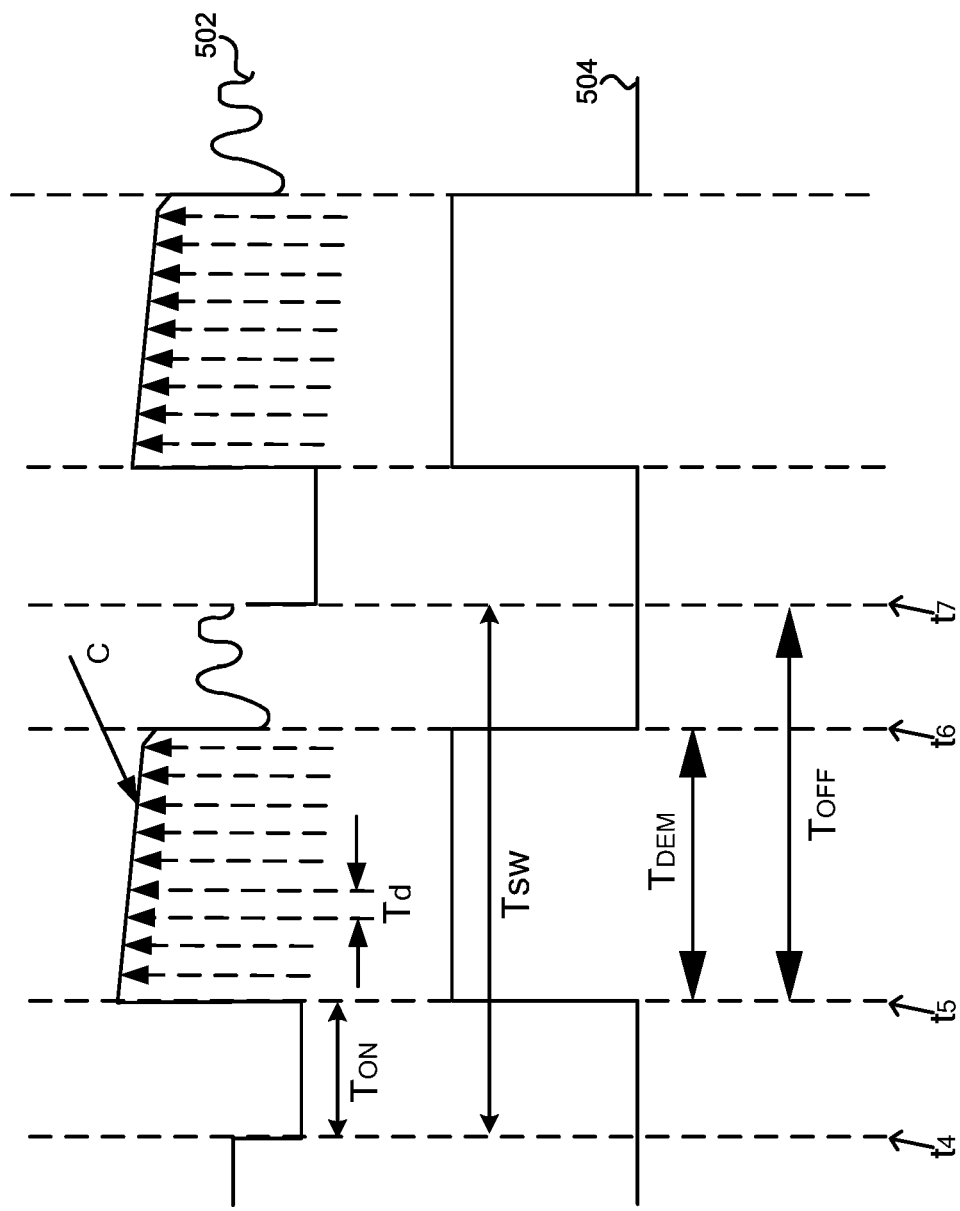
FIG. 7 is a simplified timing diagram for the power conversion system as shown in FIG. 5 according to an embodiment of the present invention.

FIG. 7 is a simplified timing diagram for the power conversion system 300 according to an embodiment of the present invention. This diagram is merely an example, which should not unduly limit the scope of the claims. One of ordinary skill in the art would recognize many variations, alternatives, and modifications. The waveform 502 represents the feedback signal 354 as a function of time, and the waveform 504 represents the demagnetization-detection signal 356 as a function of time. As shown in FIG. 5, a switching period $T_{sw}$ includes an on-time period $T_{on}$ and an off-time period $T_{off}$. The on-time period $T_{on}$ starts at time $t_4$ and ends at time $t_5$, and the off-time period $T_{off}$ starts at the time $t_5$ and ends at time $t_7$. The off-time period $T_{off}$ includes a demagnetization period $T_{DEM}$ which starts at the time $t_5$ and ends at time $t_6$.

As shown in FIG. 4 and FIG. 5, if the demagnetization-detection signal 356 indicates the demagnetization period $T_{DEM}$ begins (e.g., a rising edge in the demagnetization-detection signal 356 at is as shown by the waveform 504), the counter component 404 is triggered, and generates multiple sampling signals $414_1$~$414_n$ (e.g., $K_1$~$K_n$, where n is an integer) during the demagnetization period $T_{DEM}$, in some embodiments. For example, the sample-and-hold component 402 samples the feedback signal 354 multiple times in response to the sampling signals $414_1$~$414_n$ and holds the sampled signals (e.g., onto one or more capacitors) until the end of the demagnetization period (e.g., at $t_6$). As shown by the waveform 502 in FIG. 5, during the demagnetization period $T_{DEM}$, the feedback signal 354 is sampled once for every sampling period (e.g., $T_d$), according to some embodiments.

In one embodiment, if the demagnetization-detection signal 356 indicates the demagnetization period ends (e.g., a falling edge in the demagnetization-detection signal 356 at $t_6$ as shown by the waveform 504), the flip-latch component 408 receives multiple signals $416_1 \sim 416_n$ (e.g., $q_1 \sim q_n$, where n is an integer) from the counter component 404 and generates multiple signals $418_1 \sim 418_n$ (e.g., $Q_1 \sim Q_n$, where n is an integer). In yet another example, the encoding component 410 performs coding operations based on at least information associated with the signals $418_1 \sim 418_n$ and generates multiple selection signals $420_1 \sim 420_n$ (e.g., $S_1 \sim S_n$, where n is an integer). In yet another example, the select-and-hold component 406 selects and holds one of the signals $422_1 \sim 422_n$ (e.g., n is an integer) associated with the sampled signals from the sample-and-hold component 402 according to the selection signals $420_1 \sim 420_n$. The select-and-hold component 406 may select and hold one of the signals $422_1 \sim 422_n$ that is associated with a particular sampled signal (e.g., sampled at point C as shown in FIG. 7, two sampling periods before the end of the demagnetization period), in some embodiments. For example, the selected-and-held signal is then output as the processed signal 358. In yet another example, after a time period for sampling, the counter component 404 is reset (e.g., set to 0) until a next demagnetization period begins.

Figure 8:
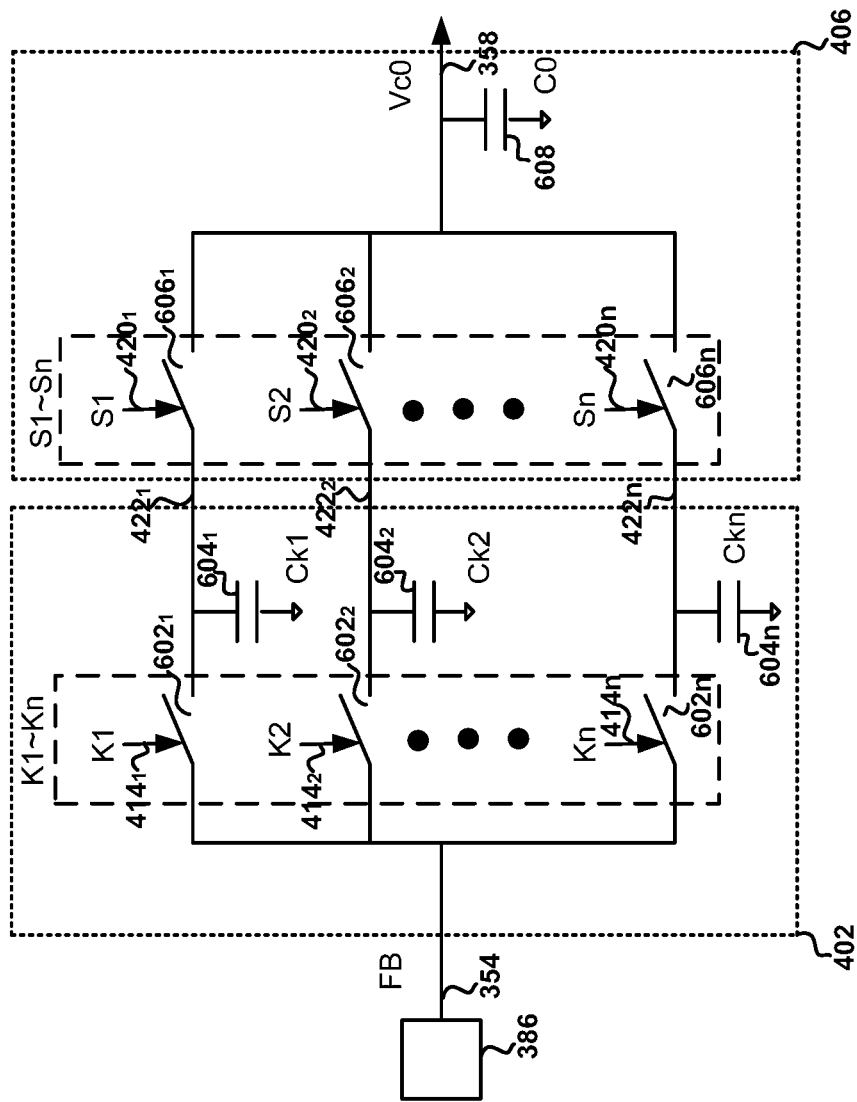
FIG. 8 is a simplified diagram showing the sample-and-hold component and the select-and-hold component as parts of the signal processing component as shown in FIG. 6 according to an embodiment of the present invention.

FIG. 8 is a simplified diagram showing the sample-and-hold component 402 and the select-and-hold component 406 as parts of the signal processing component 304 according to an embodiment of the present invention. This diagram is merely an example, which should not unduly limit the scope of the claims. One of ordinary skill in the art would recognize many variations, alternatives, and modifications. The sample-and-hold component 402 includes switches $602_1 \sim 602_n$ (e.g., n is an integer) and capacitors $604_1 \sim 604_n$ (e.g., n is an integer). The select-and-hold component 406 includes switches $606_1 \sim 606_n$ (e.g., n is an integer) and a capacitors 608.

According to one embodiment, referring back to FIG. 4 and FIG. 5, during the demagnetization period $T_{DEM}$, the feedback signal 354 is sampled once every sampling period (e.g., $T_d$), and the counter component 404 changes the sampling signals $414_1 \sim 414_n$ in response to each sampling of the feedback signal 354. For example, one of the switches $602_1 \sim 602_n$ is closed (e.g., being turned on) in response to each sampling, and the feedback signal 354 is sampled and held at one of the capacitors $604_1 \sim 604_n$ that corresponds to the closed switch. As the number of the switches $602_1 \sim 602_n$ and the capacitors $604_1 \sim 604_n$ is predetermined, the feedback signal 354 may be sampled and held in a circular manner if the number of sampled signals exceeds the number of the switches $602_1 \sim 602_n$, in some embodiments. For example, if the feedback signal 354 is sampled n+2 times during the demagnetization period, the first n sampled signals pass through the switches $602_1 \sim 602_n$ and are held at the capacitors $604_1 \sim 604_n$ respectively. The n+1 sampled signal and the n+2 sampled signal pass through the switches $602_1$ and $602_2$, and are held at the capacitors $604_1$ and $604_2$ respectively.

According to another embodiment, in response to the selection signals $420_1 \sim 420_n$ (e.g., $S_1 \sim S_n$, where n is an integer), one of the switches $606_1 \sim 606_n$ is closed (e.g., being turned on). For example, one of the signals $422_1 \sim 422_n$ from the sample-and-hold component 402 is selected to pass through the closed switch and is held at the capacitor 608 until the selected-and-held signal is output as the processed signal 358.

Figure 9:
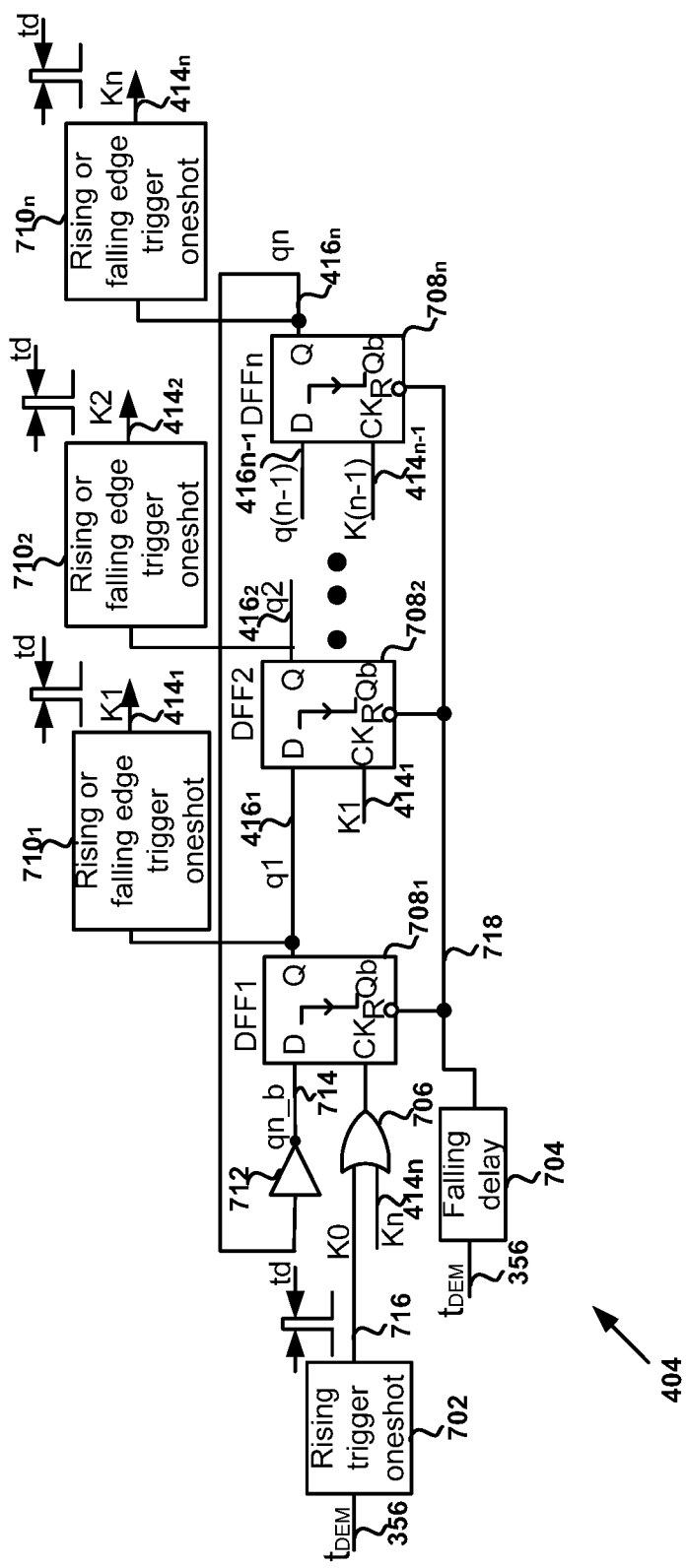
FIG. 9 is a simplified diagram showing the counter component as parts of the signal processing component as shown in FIG. 6 according to an embodiment of the present invention.

FIG. 9 is a simplified diagram showing the counter component 404 as parts of the signal processing component 304 according to an embodiment of the present invention. This diagram is merely an example, which should not unduly limit the scope of the claims. One of ordinary skill in the art would recognize many variations, alternatives, and modifications. The counter component 404 includes signal generators 702, 704, $710_1 \sim 710_n$ (e.g., n is an integer), flip-flop components $708_{1 \sim n}$ (e.g., n is an integer), a NOT gate 712, and an OR gate 706. For example, the signal generator 702 is triggered by a rising edge in the demagnetization-detection signal 356. In another example, the signal generators $710_{1 \sim n}$ (e.g., n is an integer) are triggered by a rising edge or a falling edge of the signals $416_1 \sim 416_n$ (e.g., $q_1 \sim q_n$, n is an integer).

Figure 10:
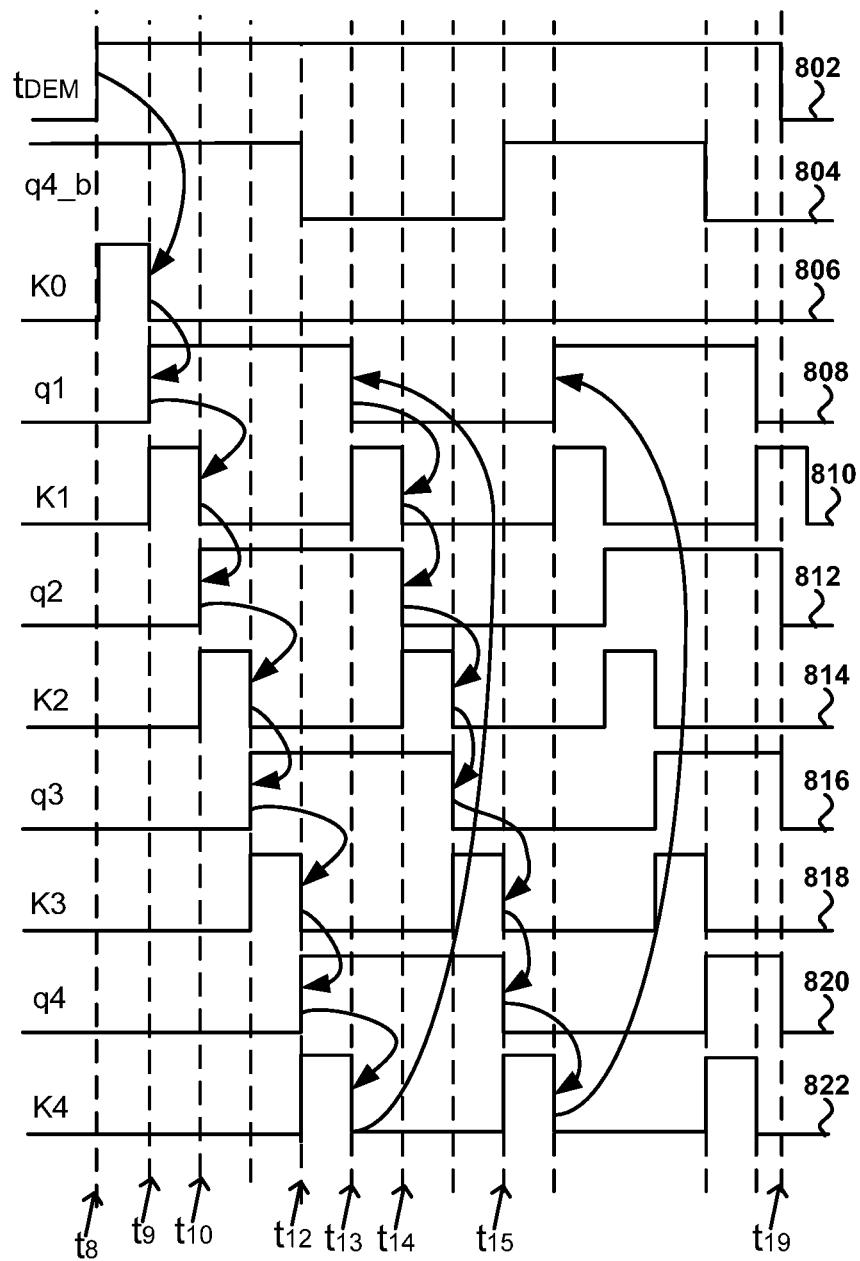
FIG. 10 shows a simplified timing diagram for the counter component as parts of the signal processing component as shown in FIG. 6 according to an embodiment of the present invention.

FIG. 10 shows a simplified timing diagram for the counter component 404 as parts of the signal processing component 304 according to an embodiment of the present invention. This diagram is merely an example, which should not unduly limit the scope of the claims. One of ordinary skill in the art would recognize many variations, alternatives, and modifications. For example, the counter component 404 includes four flip-flop components $708_1 \sim 708_4$. The waveform 802 represents the demagnetization-detection signal 356 as a function of time, the waveform 804 represents a signal 714 (e.g., $q_{4\_b}$) as a function of time, and the waveform 806 represents a signal 716 (e.g., $K_0$) as a function of time. In addition, the waveform 808 represents the signals $416_1$ (e.g., $q_1$) as a function of time, the waveform 810 represents the signal $414_1$ (e.g., $K_1$) as a function of time, the waveform 812 represents the signals $416_2$ (e.g., $q_2$) as a function of time, and the waveform 814 represents the signal $414_2$ (e.g., $K_2$) as a function of time. Further, the waveform 816 represents the signals $416_3$ (e.g., $q_3$) as a function of time, the waveform 818 represents the signal $414_3$ (e.g., $K_3$) as a function of time, the waveform 820 represents the signals $416_4$ (e.g., $q_4$) as a function of time, and the waveform 822 represents the signal $414_4$ (e.g., $K_4$) as a function of time.

As shown in FIG. 7 and FIG. 8, if the demagnetization-detection signal 356 is at a logic low level (e.g., before $t_8$ as shown by the waveform 802), the signals $416_1 \sim 416_n$ (e.g., $q_1 \sim q_n$, n is an integer) are all at the logic low level (e.g., as shown by the waveforms 808, 812, 816 and 820), while a signal 714 (e.g., $q_{n\_b}$) generated by the NOT gate 712 is at a logic high level (e.g., as shown by the waveform 804). For example, if the demagnetization-detection signal 356 changes from the logic low level to the logic high level (e.g., at the beginning of a demagnetization period), the rising edge in the demagnetization-detection signal 356 (e.g., at $t_8$ as shown by the waveform 802) triggers the signal generator 702 which generates a pulse signal 716 (e.g., $K_0$) with a pulse width (e.g., $T_d$) as shown by the waveform 806. In another example, a falling edge (e.g., at $t_9$) of the pulse signal 716 (e.g., $K_0$) triggers the flip-flop component $708_1$ to change the signal $416_1$ (e.g., $q_1$) from the logic low level to the logic high level (e.g., at $t_9$ as shown by the waveform 808). In yet another example, the rising edge in the signal $416_1$ (e.g., $q_1$) triggers the signal generator $710_1$ to generate a pulse in the signal $414_1$ (e.g., $K_1$) with a pulse width (e.g., $T_d$) as shown by the waveform 810. In yet another example, the falling edge of the pulse (e.g., at $t_{10}$) in the signal $414_1$ (e.g., $K_1$) triggers the flip-flop component $708_2$ to change the signal $416_2$ (e.g., $q_2$) from the logic low level to the logic high level (e.g., at $t_{10}$ as shown by the waveform 812). In yet another example, the rising edge in the signal $416_2$ (e.g., $q_2$) triggers the signal generator $710_2$ to generate a pulse in the signal $414_2$ (e.g., $K_2$) with a pulse width (e.g., $T_d$) as shown by the waveform 814. Then, until the signal $416_n$ (e.g., $q_n$)

changes from the logic low level to the logic high level (e.g., at $t_{12}$ as shown by the waveform 820), the rising edge in the signal $416_n$ (e.g., $q_n$) triggers the signal generator $710_n$ to generate a pulse in the signal $414_n$ (e.g., $K_n$) with a pulse width (e.g., $T_d$) as shown by the waveform 822, in some embodiments.

According to another embodiment, if the signal $416_n$ (e.g., $q_n$) is at the logic high level (e.g., between $t_{12}$ and $t_{13}$ as shown by the waveform 820), the signal 714 is at the logic low level (e.g., as shown by the waveform 804). For example, a falling edge of the pulse (e.g., at $t_{13}$) in the signal $414_n$ (e.g., $K_n$) triggers the signal generator $708_1$ to change the signal $416_1$ (e.g., $q_1$) from the logic high level to the logic low level (e.g., at $t_{13}$ as shown by the waveform 808). In another example, the falling edge in the signal $416_1$ (e.g., $q_1$) triggers the signal generator $710_1$ to generate another pulse in the signal $414_1$ (e.g., $K_1$) with a pulse width (e.g., $T_d$) as shown by the waveform 810. In yet another example, the falling edge of the pulse (e.g., at $t_{14}$) in the signal $414_1$ (e.g., $K_1$) triggers the flip-flop component $708_2$ to change the signal $416_2$ (e.g., $q_2$) from the logic high level to the logic low level (e.g., at $t_{14}$ as shown by the waveform 812). In yet another example, the falling edge in the signal $416_2$ (e.g., $q_2$) triggers the signal generator $710_2$ to generate another pulse in the signal $414_2$ (e.g., $K_2$) with a pulse width (e.g., $T_d$) as shown by the waveform 814. Then, until the signal $416_n$ (e.g., $q_n$) changes from the logic high level to the logic low level (e.g., at $t_{15}$ as shown by the waveform 820), the falling edge in the signal $416_n$ (e.g., $q_n$) triggers the signal generator $710_n$ to generate another pulse in the signal $414_n$ (e.g., $K_n$) with a pulse width (e.g., $T_d$) as shown by the waveform 822, in certain embodiments.

The above-described process continues to operate until the demagnetization-detection signal 356 changes to the logic low level which indicates the end of the demagnetization period (e.g., at $t_{19}$ as shown by the waveform 802), according to some embodiments. For example, the signal generator 704 generates a signal 718 to reset (e.g., set to 0) the flip-flop components $708_{1-n}$ after a short delay (e.g., much shorter than $T_d$ in duration). In another example, when the demagnetization-detection signal 356 changes to the logic high level again (e.g., at the beginning of a next demagnetization period), the above-described process starts again.

Figure 11:
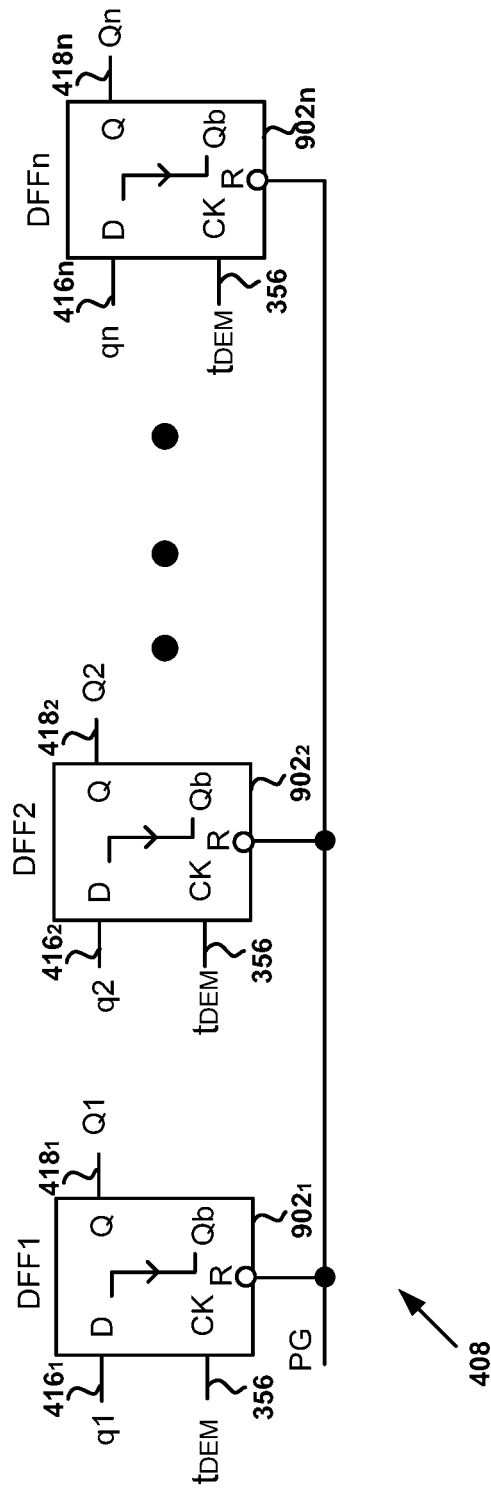
FIG. 11 is a simplified diagram showing the flip-latch component as parts of the signal processing component as shown in FIG. 6 according to an embodiment of the present invention.

FIG. 11 is a simplified diagram showing the flip-latch component 408 as parts of the signal processing component 304 according to an embodiment of the present invention. This diagram is merely an example, which should not unduly limit the scope of the claims. One of ordinary skill in the art would recognize many variations, alternatives, and modifications. The flip-latch component 408 includes flip-flop components $902_1$~$902_n$ (e.g., n is an integer).

According to one embodiment, if the demagnetization-detection signal 356 changes from a logic high level to a logic low level, the falling edge of the demagnetization-detection signal 356 triggers the flip-flop components $902_1$~$902_n$ to sample and hold the signals $416_1$~$416_n$ and outputs the signals $418_1$~$418_n$. For example, referring back to FIG. 4 and FIG. 6, the signals $418_1$~$418_n$ are received by the encoding component 410 for generating the selection signals $420_1$~$420_n$ to select one of the signals $422_1$~$422_n$ to be held on the capacitor 608.

According to another embodiment, the flip-latch component 408 includes four flip-flop components $902_1$~$902_4$. For example, in response to the selection signals $420_1$~$420_n$, the select-and-hold component 406 is to select one of the signals $422_1$~$422_n$ associated with sampling the feedback signal 354 at a particular time. In another example, the select-and-hold component 406 selects one of the signals $422_1$~$422_n$ that is associated with sampling the feedback signal 354 two sampling periods (e.g., $T_d$) before the end of a demagnetization period (e.g., at point C as shown in FIG. 7). A truth table representative of such selection is as follows, in some embodiments.

| $Q_4$ | $Q_3$ | $Q_2$ | $Q_1$ | $S_4$ | $S_3$ | $S_2$ | $S_1$ |
|---|---|---|---|---|---|---|---|
| 0 | 0 | 0 | 0 | 0 | 0 | 1 | 0 |
| 0 | 0 | 0 | 1 | 0 | 1 | 0 | 0 |
| 0 | 0 | 1 | 1 | 1 | 0 | 0 | 0 |
| 0 | 1 | 1 | 1 | 0 | 0 | 0 | 1 |
| 1 | 1 | 1 | 1 | 0 | 0 | 1 | 0 |
| 1 | 1 | 1 | 0 | 0 | 1 | 0 | 0 |
| 1 | 1 | 0 | 0 | 1 | 0 | 0 | 0 |
| 1 | 0 | 0 | 0 | 0 | 0 | 0 | 1 |
| 0 | 0 | 0 | 0 | 0 | 0 | 1 | 0 |

According to another embodiment, a system controller for regulating a power conversion system includes a signal processing component and a driving component. The signal processing component is configured to receive a feedback signal associated with an output signal of a power conversion system and generate a first processed signal based on at least information associated with the feedback signal. The driving component is configured to generate a drive signal based on at least information associated with the first processed signal and output the drive signal to a switch in order to affect a primary current flowing through a primary winding, the drive signal being associated with a demagnetization period corresponding to a demagnetization process of the power conversion system. The signal processing component is further configured to, sample and hold the feedback signal a plurality of times during the demagnetization period to generate a plurality of sampled and held signals, select a signal from the plurality of sampled and held signals, hold the selected signal, and generate the first processed signal based on at least information associated the selected and held signal. For example, the system controller is implemented according to at least FIG. 5, FIG. 6, and/or FIG. 7.

According to yet another embodiment, a signal processing device for regulating a power conversion system includes a sampling and holding component and a selection and holding component. The sampling and holding component is configured to sample and hold a feedback signal a plurality of times during a demagnetization period and generate a plurality of sampled and held signals based on at least information associated with the feedback signal, the feedback signal being associated with an output signal of a power conversion system, the demagnetization period corresponding to a demagnetization process of the power conversion system. The selection and holding component is configured to select a signal from the plurality of sampled and held signals, hold the selected signal, and output a first processed signal based on at least information associated with the selected and held signal for regulating the power conversion system. For example, the system controller is implemented according to FIG. 5, FIG. 6, FIG. 7, FIG. 8, FIG. 9, FIG. 10, and/or FIG. 11.

In one embodiment, a method for regulating a power conversion system includes receiving a feedback signal associated with an output signal of a power conversion system, generating a processed signal based on at least information associated with the feedback signal, and generating a drive signal based on at least information associated with the processed signal. The method further includes outputting the drive signal to a switch in order to affect a primary current flowing through a primary winding, the drive signal being associated with a demagnetization period corresponding to a demagnetization process of the power conversion system. The process for generating a processed signal based on at least information associated with the feedback signal includes, sampling and holding the feedback signal a plurality of times during the demagnetization period to generate a plurality of sampled and held signals, selecting a signal from the plurality of sampled and held signals, holding the selected signal, and generating the processed signal based on at least information associated the selected and held signal. For example, the method is implemented according to at least FIG. 5, FIG. 6, and/or FIG. 7.

In another embodiment, a method for regulating a power conversion system includes sampling and holding a feedback signal a plurality of times during a demagnetization period, the feedback signal being associated with an output signal of a power conversion system, the demagnetization period corresponding to a demagnetization process of the power conversion system, generating a plurality of sampled and held signals based on at least information associated with the feedback signal, and selecting a signal from the plurality of sampled and held signals. The method further includes holding the selected signal, and outputting a processed signal based on at least information associated with the selected and held signal for regulating the power conversion system. For example, the method is implemented according to FIG. 5, FIG. 6, FIG. 7, FIG. 8, FIG. 9, FIG. 10, and/or FIG. 11.

For example, some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits. In yet another example, various embodiments and/or examples of the present invention can be combined.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A system controller for regulating a power converter, the system controller comprising:
   a signal processor configured to receive a feedback signal associated with an output signal of a power converter and generate a first processed signal based on at least information associated with the feedback signal; and
   a drive signal generator configured to generate a drive signal based on at least information associated with the first processed signal and output the drive signal to a switch in order to affect a primary current flowing through a primary winding, the drive signal being associated with multiple demagnetization periods, each demagnetization period of the multiple demagnetization periods corresponding to a demagnetization process of the power converter;
   wherein the signal processor is further configured to:
   sample and hold the feedback signal a plurality of times during each demagnetization period of the multiple demagnetization periods to generate a plurality of sampled and held signals;
   select a signal from the plurality of sampled and held signals;
   hold the selected signal; and
   generate the first processed signal based on at least information associated with the selected and held signal.

2. The system controller of claim 1 wherein the signal processor includes:
   a signal sampler configured to sample and hold the feedback signal a plurality of times during each demagnetization period of the multiple demagnetization periods and generate the plurality of sampled and held signals based on at least information associated with the feedback signal; and
   a signal selector configured to select a signal from the plurality of sampled and held signals, hold the selected signal, and output the first processed signal based on at least information associated with the selected and held signal for regulating the power converter.

3. The system controller of claim 2 wherein the signal processor further includes a counter configured to receive a detection signal indicating each demagnetization period of the multiple demagnetization periods and generate a plurality of sampling signals based on at least information associated with the detection signal.

4. The system controller of claim 3 wherein the signal sampler is further configured to receive the plurality of sampling signals and to sample and hold the feedback signal the plurality of times in response to the plurality of sampling signals respectively.

5. The system controller of claim 4 wherein the signal sampler includes:
   a plurality of first switches configured to be closed in response to the plurality of sampling signals respectively in order to sample the feedback signal; and
   a plurality of first capacitors coupled to the plurality of first switches respectively in order to hold the sampled feedback signal.

6. The system controller of claim 3 wherein the counter is further configured to generate a plurality of counting signals representing the number of signals for the plurality of sampling signals.

7. The system controller of claim 6 wherein the counter includes:
   a first signal processor configured to receive the detection signal and generate a second processed signal based on at least information associated with the detection signal;
   a plurality of first flip-flops configured to generate the plurality of counting signals respectively; and
   a plurality of second signal processors configured to receive the plurality of counting signals and generate the plurality of sampling signals respectively.

8. The system controller of claim 6 wherein the signal processor further includes an encoder configured to process information associated with the plurality of counting signals and generate a plurality of selection signals based on at least information with the plurality of counting signals.

9. The system controller of claim 8 wherein the signal selector is configured to receive the plurality of selection signals and select the signal from the plurality of sampled and held signals based on at least information associated with the plurality of selection signals.

10. The system controller of claim 9 wherein the signal selector includes:
   a plurality of second switches configured to be closed in response to the plurality of selection signals respectively in order to select the signal from the plurality of sampled and held signals; and
   a plurality of second capacitors coupled to the plurality of second switches respectively in order to hold the selected signal.

11. The system controller of claim 9 where the signal processor further includes a flip-latch configured to receive the plurality of counting signals and output a plurality of first signals to the encoder for generating the selection signals.

12. The system controller of claim 11 wherein the flip-latch includes a plurality of second flip-flops configured to receive the plurality of counting signals respectively and generate the plurality of first signals.

13. A signal processing device for regulating a power converter, the device comprising:
   a signal sampler configured to sample and hold a feedback signal a plurality of times during each demagnetization period of multiple demagnetization periods and generate a plurality of sampled and held signals based on at least information associated with the feedback signal, the feedback signal being associated with an output signal of a power converter, each demagnetization period of the multiple demagnetization periods corresponding to a demagnetization process of the power converter; and
   a signal selector configured to select a signal from the plurality of sampled and held signals, hold the selected signal, and output a first processed signal based on at least information associated with the selected and held signal for regulating the power converter.

14. The device of claim 13, and further comprising a counter configured to receive a detection signal indicating each demagnetization period of the multiple demagnetization periods and generate a plurality of sampling signals based on at least information associated with the detection signal.

15. The device of claim 14 wherein the signal sampler is further configured to receive the plurality of sampling signals and to sample and hold the feedback signal the plurality of times in response to the plurality of sampling signals respectively.

16. The device of claim 15 wherein the signal sampler includes:
   a plurality of first switches configured to be closed in response to the plurality of sampling signals respectively in order to sample the feedback signal; and
   a plurality of first capacitors coupled to the plurality of first switches respectively in order to hold the sampled feedback signal.

17. The device of claim 14 wherein the counter is further configured to generate a plurality of counting signals representing the number of signals for the plurality of sampling signals.

18. The device of claim 17 wherein the counter includes:
   a first signal processor configured to receive the detection signal and generate a second processed signal based on at least information associated with the detection signal;
   a plurality of first flip-flops configured to generate the plurality of counting signals respectively; and
   a plurality of second signal processors configured to receive the plurality of counting signals and generate the plurality of sampling signals respectively.

19. The device of claim 17, and further comprising an encoder configured to process information associated with the plurality of counting signals and generate a plurality of selection signals based on at least information associated with the plurality of counting signals.

20. The device of claim 19 wherein the signal selector is configured to receive the plurality of selection signals and select the signal from the plurality of sampled and held signals based on at least information associated with the plurality of selection signals.

21. The device of claim 20 wherein the signal selector includes:
   a plurality of second switches configured to be closed in response to the plurality of selection signals respectively in order to select the signal from the plurality of sampled and held signals; and
   a plurality of second capacitors coupled to the plurality of second switches respectively in order to hold the selected signal.

22. The device of claim 20, and further comprising a flip-latch configured to receive the plurality of counting signals and output a plurality of first signals to the encoder for generating the selection signals.

23. The device of claim 22 wherein the flip-latch includes a plurality of second flip-flops configured to receive the plurality of counting signals respectively and generate the plurality of first signals.

24. A method for regulating a power converter, the method comprising:
   receiving a feedback signal associated with an output signal of a power converter;
   generating a processed signal based on at least information associated with the feedback signal;
   processing information associated with the processed signal;
   generating a drive signal based on at least information associated with the processed signal; and
   outputting the drive signal to a switch in order to affect a primary current flowing through a primary winding, the drive signal being associated with multiple demagnetization periods, each demagnetization period of the multiple demagnetization periods corresponding to a demagnetization process of the power converter;
   wherein the process for generating a processed signal based on at least information associated with the feedback signal includes:
      sampling and holding the feedback signal a plurality of times during each demagnetization period of the multiple demagnetization periods to generate a plurality of sampled and held signals;
      selecting a signal from the plurality of sampled and held signals;
      holding the selected signal; and
      generating the processed signal based on at least information associated with the selected and held signal.

25. A method for regulating a power converter, the method comprising:
   sampling and holding a feedback signal a plurality of times during each demagnetization period of multiple demagnetization periods, the feedback signal being associated with an output signal of a power converter, each demagnetization period of the multiple demagnetization periods corresponding to a demagnetization process of the power converter;

generating a plurality of sampled and held signals based on at least information associated with the feedback signal;

selecting a signal from the plurality of sampled and held signals;

holding the selected signal; and outputting a processed signal based on at least information associated with the selected and held signal for regulating the power converter.

26. The method of claim 25, and further comprising:

receiving a detection signal indicating each demagnetization period of the multiple demagnetization periods; and generating a plurality of sampling signals based on at least information associated with the detection signal.

27. The method of claim 26, and further comprising:

receiving the plurality of sampling signals; and sampling and holding the feedback signal the plurality of times in response to the plurality of sampling signals respectively.

28. The method of claim 27, and further comprising:

generating a plurality of counting signals representing the number of signals for the plurality of sampling signals.

29. The method of claim 28, and further comprising:

processing information associated with the plurality of counting signals; and generating a plurality of selection signals based on at least information associated with the plurality of counting signals.

30. The method of claim 29, and further comprising:

receiving the plurality of selection signals; and selecting the signal from the plurality of sampled and held signals based on at least information associated with the plurality of selection signals.

* * * * *